E. B. JUCKET.
HOSE COUPLING.
No. 36,410. Patented Sept. 9, 1862.
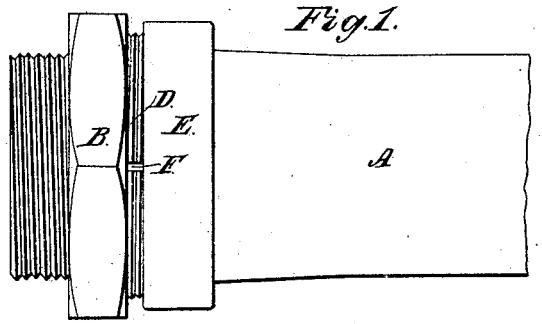
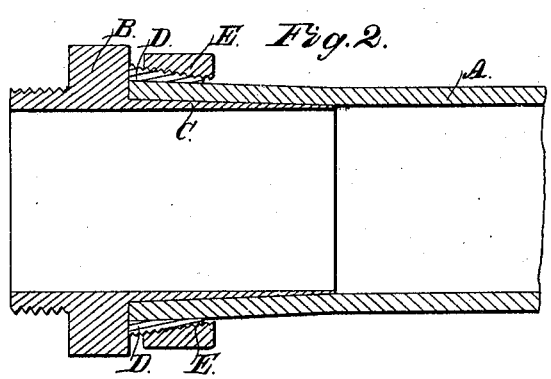
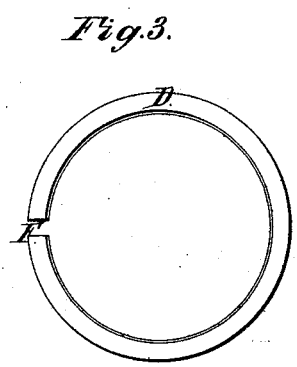
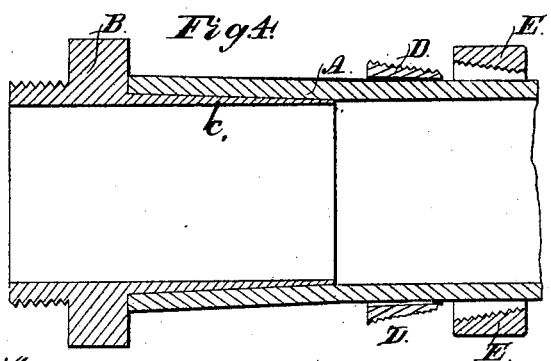
Witnesses.
John E. Earl
Hubbard Berbe
Inventor.
Edmund B Jucket

UNITED STATES PATENT OFFICE.

EDMUND B. JUCKET, OF NEW HAVEN, CONNECTICUT.

HOSE-COUPLING.

Specification of Letters Patent No. 36,410, dated September 9, 1862.

*To all whom it may concern:*

Be it known that I, EDMUND B. JUCKET, of the city and county of New Haven, in the State of Connecticut, have invented a new and useful Improvement in Hose-Couplings; and I do hereby declare that the following is a full, clear, and exact description of the construction and operation thereof, reference being had to the accompanying drawings, making a part of this specification, in which—

Figure 1 is a side view with hose attached. Fig. 2 is a longitudinal central section of the same. Fig. 3 is the binding ring detached. Fig. 4 is a longitudinal section, illustrating the manner of putting together.

Same letters refer to like parts.

To enable others skilled in the art to construct and use my invention, I will proceed to describe its construction and operation.

A is a hose of leather, rubber, or other material of common construction.

B is a coupling, to connect with another piece of hose by a corresponding coupling.

C is a neck fixed to or a part of the coupling B by which to attach the hose A to the coupling.

D is a ring, cut—as see Fig. 3—to allow it to be expanded to slip easily over the hose, or to be contracted after it has been placed over the hose, its outer surface is made conical and a screw cut upon it. E is a nut, its inside made, and a thread cut to correspond with the outer surface and thread of the ring D.

To use my invention, first place the nut E and ring D over the end of the hose, then insert the neck C into the end of the hose as shown in Fig. 4, then slip the ring D over the neck and against the coupling B into the position as shown in Fig. 2, then screw the nut E on to the ring, which will, owing to the conical shape of the ring, contract the ring around the hose and bind it firmly on to the neck of the coupling; to detach the hose from the coupling, unscrew the nut E, and release the ring D and the hose may be taken from the neck of the coupling. The cut F in the ring D opens as the ring expands, and closes as the ring contracts by pressure from the nut E.

I do not broadly claim a divided conical screw and corresponding nut a similar device is used in awl handles for securing awls or similar tools in the handle and to afford an easy method of adjustment or change, but I do claim as new and desire to secure by Letters Patent, The conical screw ring D and nut E constructed substantially as described in combination with hose couplings in the manner and for the purpose substantially as herein set forth.

EDMUND B. JUCKET.

Witnesses:
   JOHN E. EARL,
   HUBBARD BEELE.